(12) United States Patent
Sura et al.

(10) Patent No.: US 11,614,967 B2
(45) Date of Patent: Mar. 28, 2023

(54) DISTRIBUTED SCHEDULING IN A VIRTUAL MACHINE ENVIRONMENT

(71) Applicant: salesforce.com, inc., San Francisco, CA (US)

(72) Inventors: Bhinav Sura, San Mateo, CA (US); Dilip Devaraj, Colma, CA (US); Rajavardhan Sarkapally, San Francisco, CA (US); Kirankumar Kakanuru Gowdru, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 56 days.

(21) Appl. No.: 17/390,213

(22) Filed: Jul. 30, 2021

(65) Prior Publication Data

US 2021/0373949 A1    Dec. 2, 2021

Related U.S. Application Data

(63) Continuation of application No. 16/435,936, filed on Jun. 10, 2019, now Pat. No. 11,106,497, which is a continuation of application No. 15/601,199, filed on May 22, 2017, now Pat. No. 10,318,349.

(51) Int. Cl.
*G06F 9/48* (2006.01)
*G06F 9/455* (2018.01)

(52) U.S. Cl.
CPC .......... *G06F 9/4887* (2013.01); *G06F 9/4881* (2013.01); *G06F 9/45533* (2013.01)

(58) Field of Classification Search
CPC ..................................................... G06F 9/4887
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — Charlie Sun
(74) *Attorney, Agent, or Firm* — Dergosits & Noah LLP; Todd A. Noah

(57) ABSTRACT

A scheduling application is used to acquire into memory of a first processing system running on a computer system, a first jobs load for execution by the first processing system, the first jobs load stored in a database's table and having a first load size, the database associated with the computer system. The scheduling application is used to acquire into memory of a second processing system, a second jobs load for execution by a second processing system. The second jobs load being included in the table and having a second load size being balanced with the first load size and including jobs not in the first jobs load. In the first processing system's memory, jobs in the first jobs load are scheduled for execution by the first processing system. In the second processing system's memory, jobs in the second jobs load are scheduled for execution by the second processing system.

27 Claims, 11 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,212,255 B2 | 2/2019 | Yin |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0258630 A1* | 10/2011 | Fee .................. G06F 9/466 718/101 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0121371 A1 | 4/2015 | Gummaraju |
| 2015/0172563 A1 | 6/2015 | Jakobson et al. |

* cited by examiner

DISTRIBUTED SCHEDULING IN A VIRTUAL MACHINE ENVIRONMENT

PRIORITY CLAIM AND RELATED APPLICATIONS

This application is a continuation of U.S. application Ser. No. 16/435,936 filed Jun. 10, 2019, which is a continuation of U.S. application Ser. No. 15/601,199 filed May 22, 2017, now U.S. Pat. No. 10,318,349, the entire contents of which are incorporated herein by reference as if set forth in full herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to distributed scheduling.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In general, there may be multiple processing systems in a distributed environment, with each processing system configured to perform its share of the workload. For example, the workload may include multiple jobs. The jobs may be stored in a database. Each processing system may be associated with a scheduler. Each scheduler may be configured to acquire a job from the database based on a trigger. Typically, when a trigger occurs, a scheduler acquires a job associated with the trigger and fires the trigger. This causes the job to be executed. A lock may be used to enable the scheduler to update the trigger. This approach may work fine when the number of triggers is low. However, when the number of triggers increases, the above approach may cause many triggers to miss their scheduled firing time resulting in missing execution of jobs, among other problems.

BRIEF SUMMARY

For some embodiments, methods for distributed scheduling of jobs may include storing by a first scheduler into a memory of a first virtual machine running on a server computer system, a first block of jobs to be executed by the first virtual machine, the first block of jobs being included in a job table stored in a database and having a first block size, the database associated with the server computer system; storing by a second scheduler into a memory of a second virtual machine running on the server computer system, a second block of jobs to be executed by the by the second virtual machine, the second block of jobs being included in the job table and having a second block size, the second block size being equal to the first block size and including jobs that are not in included in the first block of jobs; scheduling by the first scheduler from the memory of the first virtual machine, one or more jobs in the first block of jobs for execution by the first virtual machine; and scheduling by the second scheduler from the memory of the second virtual machine, one or more jobs in the second block of jobs for execution by the second virtual machine. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
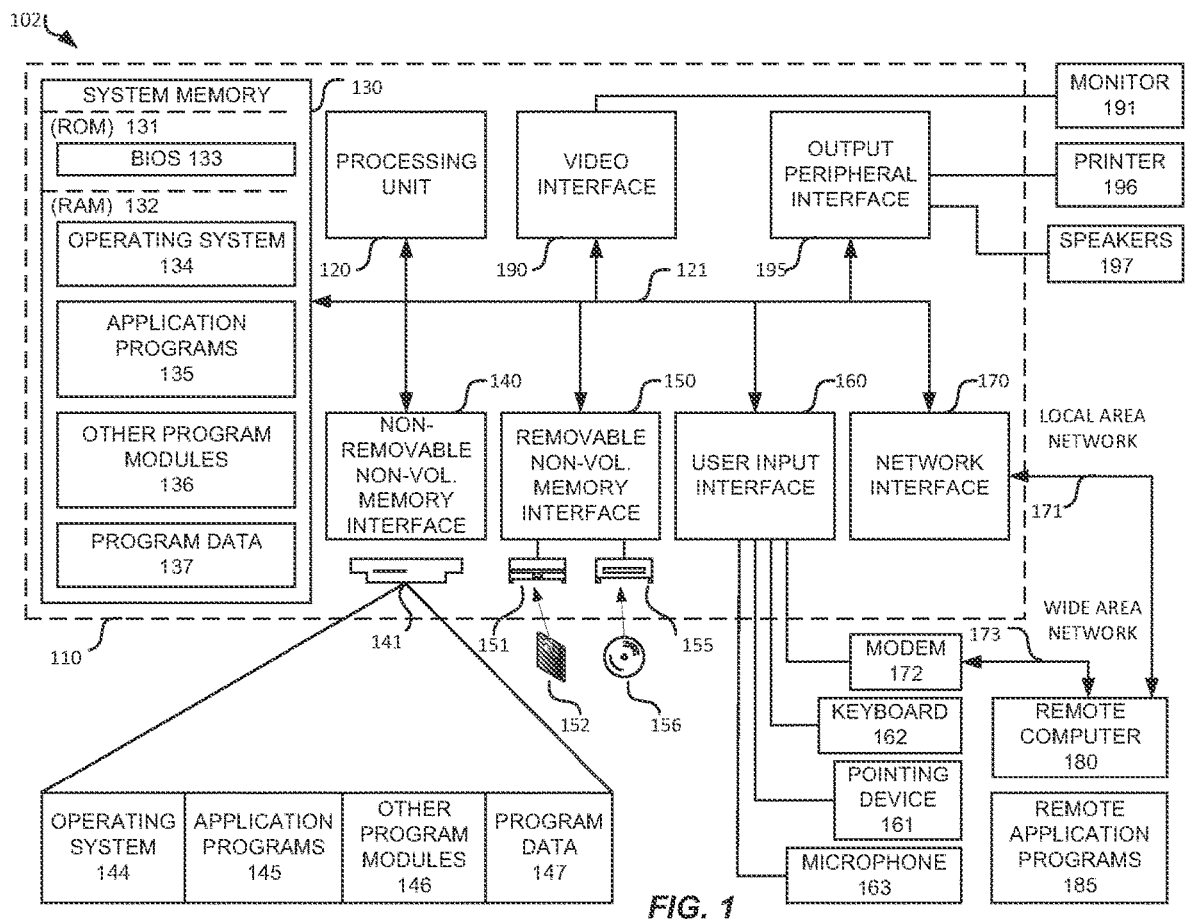
FIG. 1 shows a diagram of an example computing system that may be used with some embodiments.

Systems and methods for distributed scheduling of jobs are disclosed. Jobs in a job table may be read into memories of virtual machines by schedulers associated with those virtual machines. The virtual machines may be configured to support load balancing and failovers. The jobs may be read as a block of jobs based on a block size. A scheduler may then schedule the jobs in the block of jobs from the memory of a virtual machine. An index may be used to determine a first job of a block. A scheduling refresh may occur based on a refresh cycle to reset the blocks of jobs associated with each of the virtual machines.

The systems and methods will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include systems and methods for distributed scheduling of jobs. The method may include storing by a first scheduler into a memory of a first virtual machine running on a server computer system, a first block of jobs to be executed by the first virtual machine, the first block of jobs being included in a job table stored in a database and having a first block size, the database associated with the server computer system; storing by a second scheduler into a memory of a second virtual machine running on the server computer system, a second block of jobs to be executed by the by the second virtual machine, the second block of jobs being included in the job table and having a second block size, the second block size being equal to the first block size and including jobs that are not in included in the first block of jobs; scheduling by the first scheduler from the memory of the first virtual machine, one or more jobs in the first block of jobs for execution by the first virtual machine; and scheduling by the second scheduler from the memory of the second virtual machine, one or more jobs in the second block of jobs for execution by the second virtual machine.

The disclosed embodiments may include an apparatus for performing distributed scheduling of jobs and include a processor, and one or more stored sequences of instructions which, when executed by the processor, cause the processor to store by a first scheduler into a memory of a first virtual machine running on a server computer system, a first block of jobs to be executed by the first virtual machine, the first block of jobs being included in a job table stored in a database and having a first block size, the database associated with the server computer system; store by a second scheduler into a memory of a second virtual machine running on the server computer system, a second block of jobs to be executed by the second virtual machine, the second block of jobs being included in the job table and having a second block size, the second block size being equal to the first block size and including jobs that are not in included in the first block of jobs; schedule by the first scheduler from the memory of the first virtual machine, one or more jobs in the first block of jobs for execution by the first virtual machine; and schedule by the second scheduler from the memory of the second virtual machine, one or more jobs in the second block of jobs for execution by the second virtual machine.

The disclosed embodiments may include a computer program product comprising computer-readable program code to be executed by one or more processors when retrieved from a non-transitory computer-readable medium, the program code including instructions to store by a first scheduler into a memory of a first virtual machine running on a server computer system, a first block of jobs to be executed by the first virtual machine, the first block of jobs being included in a job table stored in a database and having a first block size, the database associated with the server computer system; store by a second scheduler into a memory of a second virtual machine running on the server computer system, a second block of jobs to be executed by the second virtual machine, the second block of jobs being included in the job table and having a second block size, the second block size being equal to the first block size and including jobs that are not in included in the first block of jobs; schedule by the first scheduler from the memory of the first virtual machine, one or more jobs in the first block of jobs for execution by the first virtual machine; and schedule by the second scheduler from the memory of the second virtual machine, one or more jobs in the second block of jobs for execution by the second virtual machine.

While one or more implementations and techniques are described with reference to an embodiment in which jobs are scheduled from a memory of a virtual machine is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some embodiments of the present invention. The computing system 102 may be used by a user to log into a server computing system and cause execution of jobs using distributed scheduling services. For some embodiments, the server computing system may be associated with a multi-tenant database environment. For example, the multi-tenant database environment may be associated with the services provided by Salesforce.com®.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
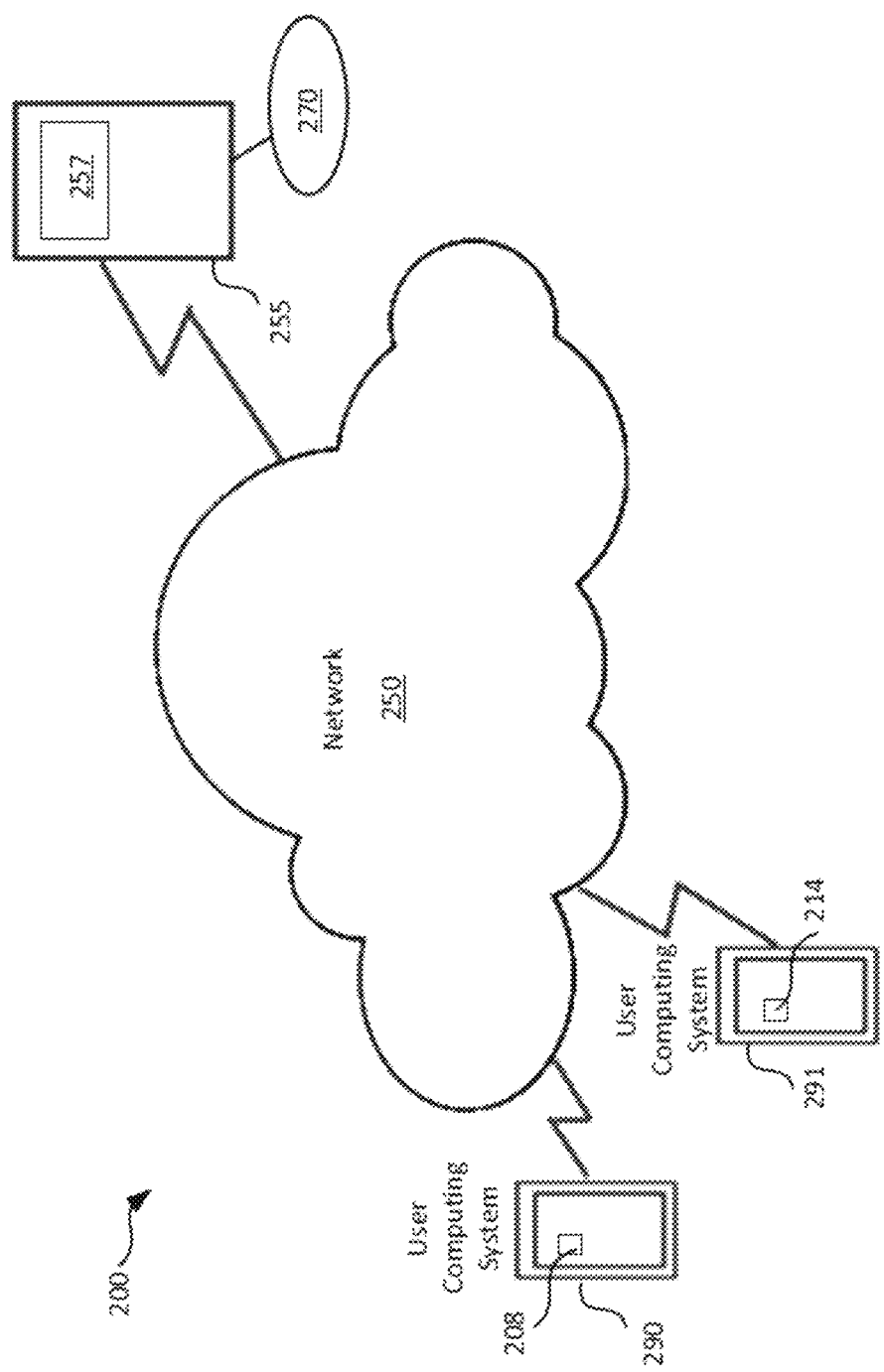
FIG. 2 shows a diagram of an example network environment that may be used with some embodiments.

FIG. 2 shows a diagram of an example network environment that may be used with some embodiments of the present invention. Network environment 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing system 255 via the network 250.

Each of the computing systems 290 and 291 may include a respective application module 208 and 214. A user may use the computing system 290 and the application module 208 to connect to and communicate with the server computing system 255 and log into application 257 (e.g., a Salesforce.com® application). The server computing system 255 may be associated with a database 270. The database 270 may be configured to store a job table that includes jobs to be executed using distributed scheduling.

Figure 3:
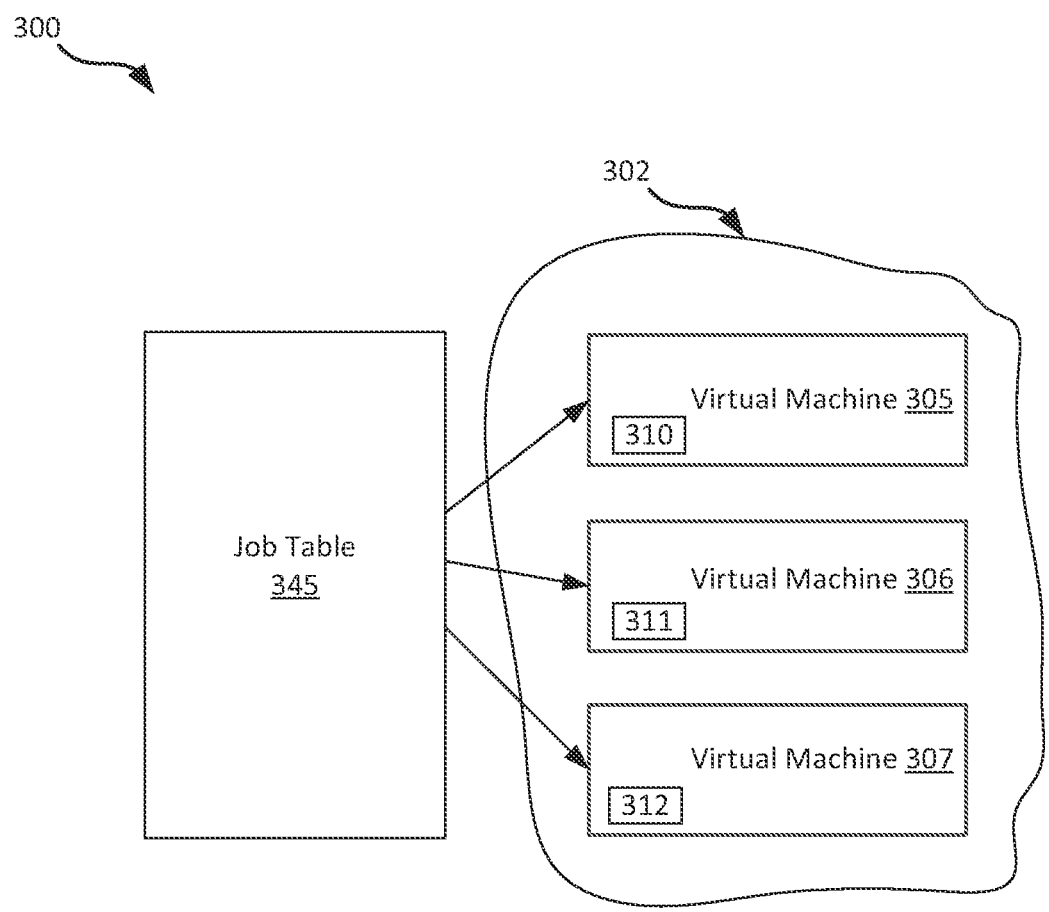
FIG. 3 shows an example diagram of a cluster of machines that may be used, in accordance with some embodiments.

FIG. 3 shows an example diagram of a cluster of machines that may be used, in accordance with some embodiments. Diagram 300 includes a cluster 302 which may include machines 305, 306 and 307. Each of the machines 305, 306 and 307 may be configured as a virtual machine (or an instance of a virtual machine). For example, the machine 305 may be a Java Virtual Machine (JVM) configured to provide a run time environment for a compiled Java program. The cluster 302 may be associated with a job table 345 configured to store all jobs that are enabled for execution. For example, a job may be a Java job and may include a compiled Java program or a set of compiled Java programs. A job may be associated with a job definition. For example, the job definition may indicate a job name, name of the Java program to execute, a start time, a stop time, a recurring frequency, etc. The job table 345 and the cluster 302 may be part of a scheduling service configured to schedule jobs in the job table 345 for execution.

The job table 345 may be stored in a database such as, for example, the database 270 (shown in FIG. 2). The database 270 may be associated with a storage device such as, for example, a disk. For example, the job table 345 may be implemented as a table with a large number of rows. Each of the rows may correspond to a job and an index. For example, the first row may correspond to an index value of zero, the second row may correspond to an index value of one, and so on. The cluster 302 may be configured with load balancing and failover consideration. Load balancing indicates that the jobs in the job table 345 may be distributed to the machines in the cluster 302 such that the workload is balanced across all the machines. Failover indicates that if one of the machines in the cluster 302 fails, another machine in the cluster 302 may take over the workload of the failed machine.

A scheduler (or scheduler instance) may be used to schedule a job for execution. For some embodiments, each of the machines in the cluster 302 may be configured to include a scheduler such as, for example, the scheduler 310, 311 or 312. The scheduling of a job may be associated with a trigger. For example, a job may be configured to execute hourly at 15 minutes past the hour. The arrows connecting the job table 345 to each of the machines 305, 306 and 307 are used to show that a job in the job table 345 may be executed by any one of the machines 305, 306 and 307. The job table 345 and the cluster 302 may be part of a scheduling service. Upon start up, the scheduling service may immediately begin performing operations to attempt to schedule the jobs in the job table 345. The operations may include acquiring access to a distributed scheduling lock table 350 (shown in FIG. 4) and reading jobs from the job table 345 into a memory of a machine.

Figure 4:
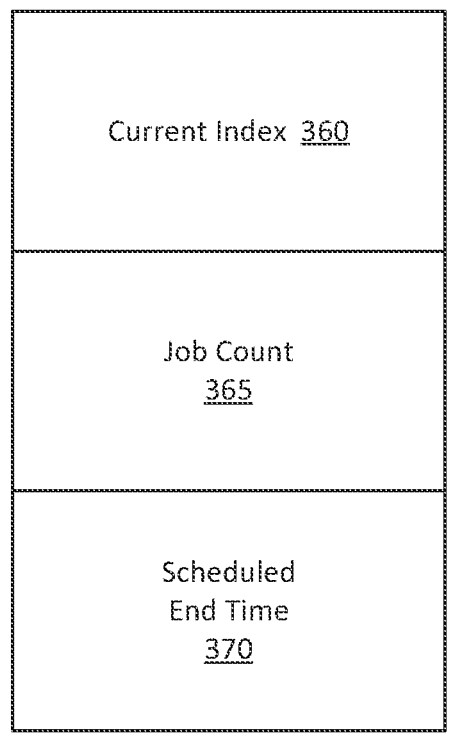
FIG. 4 shows an example distributed scheduling lock table, in accordance with some embodiments.

FIG. 4 shows an example distributed scheduling lock table, in accordance with some embodiments. A distributed scheduling lock table 350 may be configured to store values for a current index 360, a job count 365, and a scheduled end time 370. The current index 360 may have an initial value of zero. The job count 365 may have a value equal to a number of jobs stored in the job table 345. The scheduled end time 370 may include a time value to indicate when a refresh is to occur. This may be determined based on a configurable refresh cycle 510 (shown in FIG. 5) and a startup time of the scheduling service. For example, if the startup time of scheduling service is at 11:45 a.m., and the refresh cycle 510 is set at 15 minutes, then the scheduled end time 370 is 12:00 p.m. The scheduled end time 370 may then be updated to 12:15 p.m. It may be noted that if the refresh cycle 510 is shorter (e.g., 5 minutes), then the scheduling service may be refreshed more frequently.

For some embodiments, a job block 515 (shown in FIG. 5) may be set to a value that corresponds to a maximum number of jobs to be allocated to each of the machines in the cluster 302. The value of the job block 515 may be configurable. Using the job block 515 may prevent each scheduler from being overloaded, and the jobs from the job table 345 are distributed evenly across all the schedulers. For example, if the job count 365 has a value of 300,000, the job block has a value of 100,000, and the current index has a value of zero, then the first machine 305 in the cluster 302 may be allocated jobs the first 100,000 jobs from job 0 to job 99,999. For some embodiments, while the jobs are allocated to the first machine 305, the distributed scheduling lock table 350 may be locked. For some embodiments, the allocation of the jobs to a machine may be performed by a scheduler associated with that machine. It may be noted the term allocation may include reading a block of jobs from the job table 345 into a memory of a machine associated with a scheduler. The reading of the jobs may include reading the job definition associated with each job.

After the allocation of the jobs to the first machine 302, the current index 360 may be updated by adding the value of the current index 360 to the value of the job block 515. In the current example, the current index 360 is updated to the value 100,000, and the distributed scheduling lock table 350 may be released or unlocked. This may enable the second machine 306 in the cluster 302 to be allocated jobs from 100,000 to 199,999. For some embodiments, optimistic locking may be used to enable fast access to the distributed scheduling lock table 350. A numeric version locking may be used as a basis for optimistic locking. The distributed scheduling lock table 350 may include a version field to enable repeated attempt to acquire the same version of the distributed scheduling lock table 350. For example, if the second machine 306 cannot acquire the distributed scheduling lock table 350 because it is still locked, the attempt to acquire may continue until successful or until the scheduling service is shut down. While the jobs are allocated to the second machine 306, the distributed scheduling lock table 350 may again be locked. After the allocation of the jobs to the second machine 304, the current index 360 may be updated to the value 200,000, and the distributed scheduling lock table 350 may be unlocked. This may enable the third machine 307 in the cluster 302 to be allocated jobs from 200,000 to 299,999. After that, the current index 360 may be updated to the value 300,000, and the allocation of jobs may stop because the current index 360 has a value that is the same as the value of the job count 365. At this time, all of the machines in the cluster 302 have received their shares of the jobs from the job table 345, and each is ready to schedule their jobs. For some embodiments, the distributed scheduling lock table 350 may be stored in the same database as the job table 345 (shown in FIG. 3). For example, the distributed scheduling lock table 350 may be stored as a table with one row and three columns.

It may be noted that, although the examples described with FIG. 3 and FIG. 4 refer to having three machines, the number of machines and correspondingly the number of schedulers (or scheduler instances) may vary depending on the values of the job count 365 and the job block 515. For example, if the job count 365 is 400,000 instead of 300,000, then a fourth machine and scheduler may be created to service the jobs 300,000 to 399,999 so that all of the jobs may be allocated and scheduled.

Figure 5:
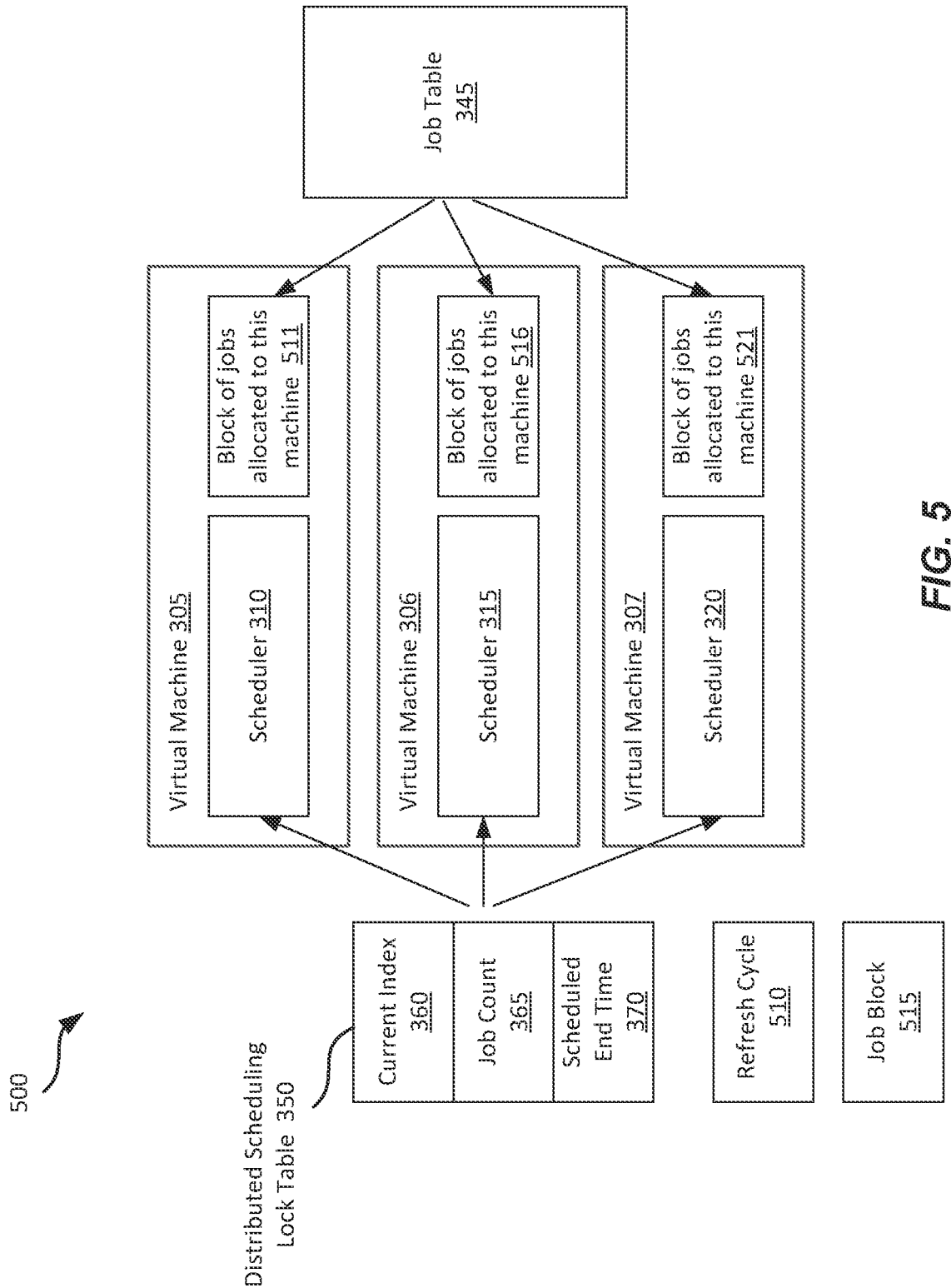
FIG. 5 shows an example of the schedulers using the distributed scheduling lock table to schedule jobs, in accordance with some embodiments.

FIG. 5 shows an example of the schedulers using the distributed scheduling lock table to schedule jobs, in accordance with some embodiments. Diagram 500 includes machines 305, 306 and 307 in a cluster, distributed scheduling lock table 350 and job table 345. For some embodiments, the block of jobs allocated to a machine may be read into the memory of the machine prior to any scheduling operations. The current index 360 may be used as a pointer to an index of a job. For example, if the current index 360 has a value of 100,000, then it may be used as a pointer to point to a location of a job at index 100,000 in the job table 345. Using the current index 360 and the job count 365, a first block of jobs 511 may be read into the memory of the first machine 305. A second block of jobs 516 may be read into the memory of the second machine 306. A third block of jobs 521 may be read into the memory of the third machine 307. Using the example of FIG. 4, the first block of jobs 511 may include jobs associated with index 0 to 99,999. Similarly, the second block of jobs 516 may include jobs associated with the index 100,000 to 199,999, and the third block of jobs 521 may include jobs associated with the index 200,000 to 299,999. The allocation may continue to the next machine until all of the jobs in the job table 345 are allocated.

The arrows pointing from the distributed scheduling lock table 350 to the schedulers 310, 315 and 320 are meant to indicate that the information in the distributed scheduling lock table 350 is used by those schedulers. The arrows from the job table 345 to the block of allocated jobs 511, 516 and 521 are meant to indicate that the block of jobs are read from the job table 345 into the memory of the associated machine.

For some embodiments, the reading of the jobs into the memory of a machine may be performed by the scheduler executing in that machine. Based on having access to the distributed scheduling lock table 350, a scheduler may access the current index 360 and compare a value of the current index 360 with a value of the job count 365. If the scheduler determines that the value of the current index 360 is less than the value of the job count 365, then that may mean that there are more jobs from the job table 345 to be allocated. Those jobs may then be read by the scheduler into the memory of the associated machine. For example, the first block of jobs 511 may be read by the scheduler 310 executing in the first machine 305. The scheduler 310 may then schedule the jobs from the memory of the first machine 305 instead of having to read the jobs from the storage device associated with the job table 345. Similarly, each of the schedulers 315 and 320 also schedules the jobs from the memory of the respective machine 306 and 307.

The scheduling of the jobs may end at the scheduled end time 370 when the schedulers on three machines 305, 306 and 307 may be disposed. The process of allocating and scheduling of jobs may then be repeated and ended at an updated scheduled end time 370. For example, if the current scheduled end time is 12:00 pm and the refresh cycle is 15 minutes, then the updated scheduled end time may be at 12:15 pm.

The scheduled end time 370 may be determined based on a clock time of a computing system that maintains the distributed scheduling lock table 350. It may be possible that while the schedulers are scheduling the jobs for execution, the jobs in the job table 345 may be updated or refreshed. The scheduled end time 370 may enable all the schedulers to get the updated jobs from the job store 345. The scheduled end time 370 may also allow one machine to take over the load of another machine when there is a failover. For some embodiment, when the scheduling service is shut down, all of the scheduling operations may be terminated and the lock on the distributed scheduling lock table 350 may be released.

Figure 6:
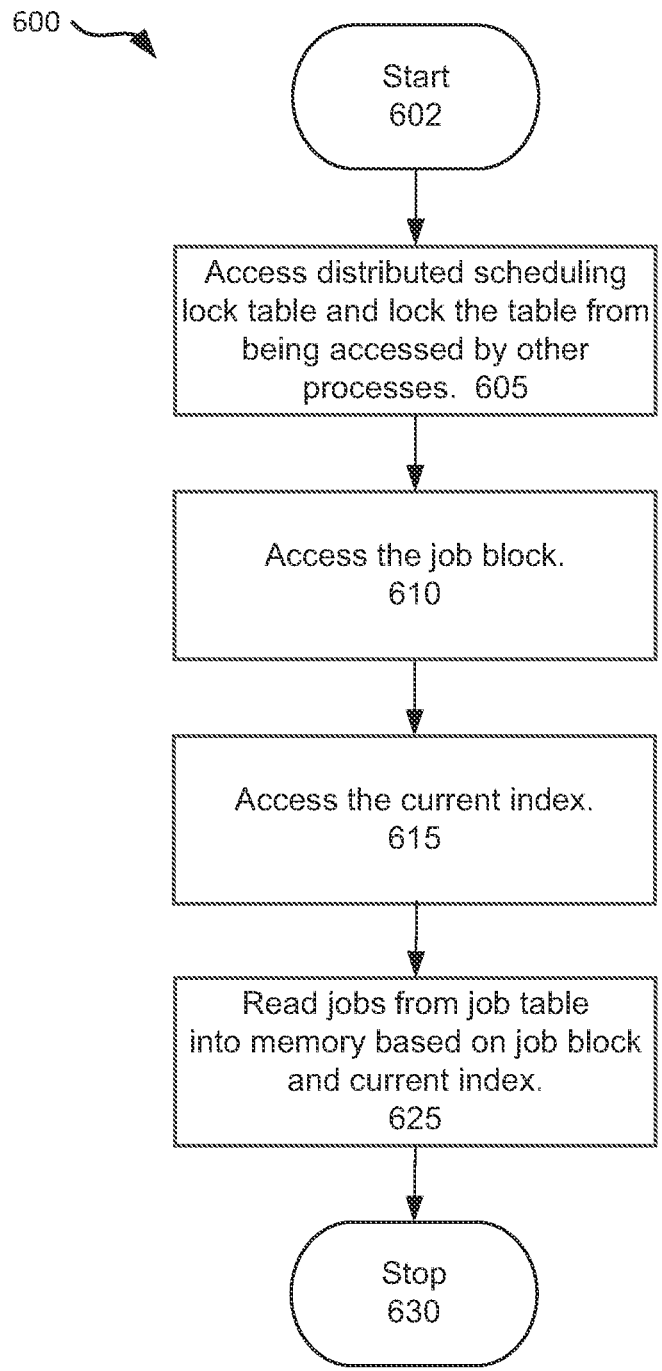
FIG. 6 shows a flowchart of an example process that may be performed by a scheduler to read jobs from a job table, in accordance with some embodiments.

FIG. 6 shows a flowchart of an example process that may be performed by a scheduler to read jobs from a job table, in accordance with some embodiments. The process 600 may start at block 602. At block 605, a scheduler may successfully acquire the distributed scheduling lock table 350. The distributed scheduling lock table 350 may then be locked. At block 610, the scheduler may retrieve a value of the job block 515. For example, the value of the job block 515 may be 100,000. At block 615, the scheduler may retrieve a value of the current index 360 from the distributed scheduling lock table 350. For example, the value of the current index 360 may be 200,000. At block 625, the scheduler may read into a memory of its associated machine jobs from the job table 345. The jobs may be determined based on the current index 360 and the job block 515. The process 600 may then stop at block 630. As described above, the process 600 may be repeated with another scheduler until all the jobs in the job table 345 are read into the memories of the appropriate machines.

Figure 7A:
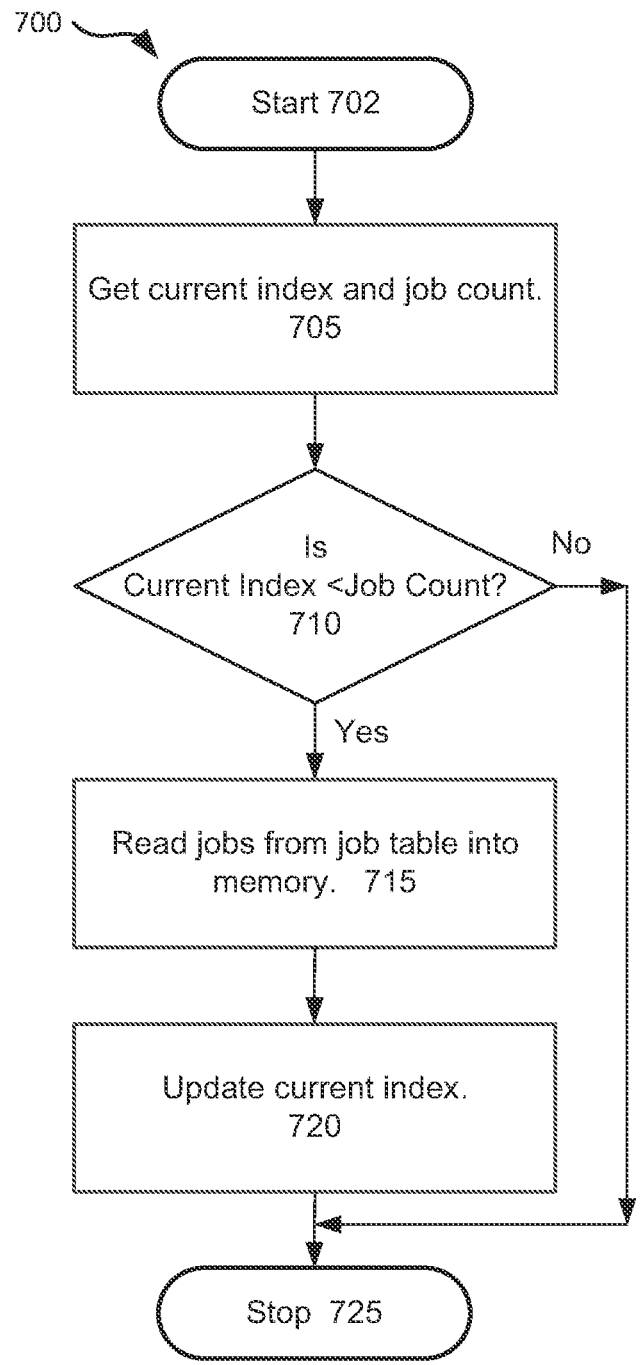
FIG. 7A shows a flowchart of an example of a process that may be performed by a scheduler to determine whether there are jobs to be scheduled, in accordance with some embodiments.

FIG. 7A shows a flowchart of an example of a process that may be performed by a scheduler to determine whether there are jobs to be scheduled, in accordance with some embodiments. The process 700 may start at block 702. At block 705, the scheduler may retrieve the current index 360 and the job count 365. At block 710, a comparison may be performed to determine whether a value of the current index 360 is less than a value of the job count 365. If not, the process may stop at block 725 because there are no more jobs in the job table 345 to be scheduled. From block 710, if the value of the current index 360 is less than the value of the job count 365, then the process may flow to block 715 where jobs may be read from the job table 345 into a memory of a machine associated with the scheduler. At block 720, the current index 360 may be updated to reflect a next job block. The process may end at block 725 for the current job block.

Figure 7B:
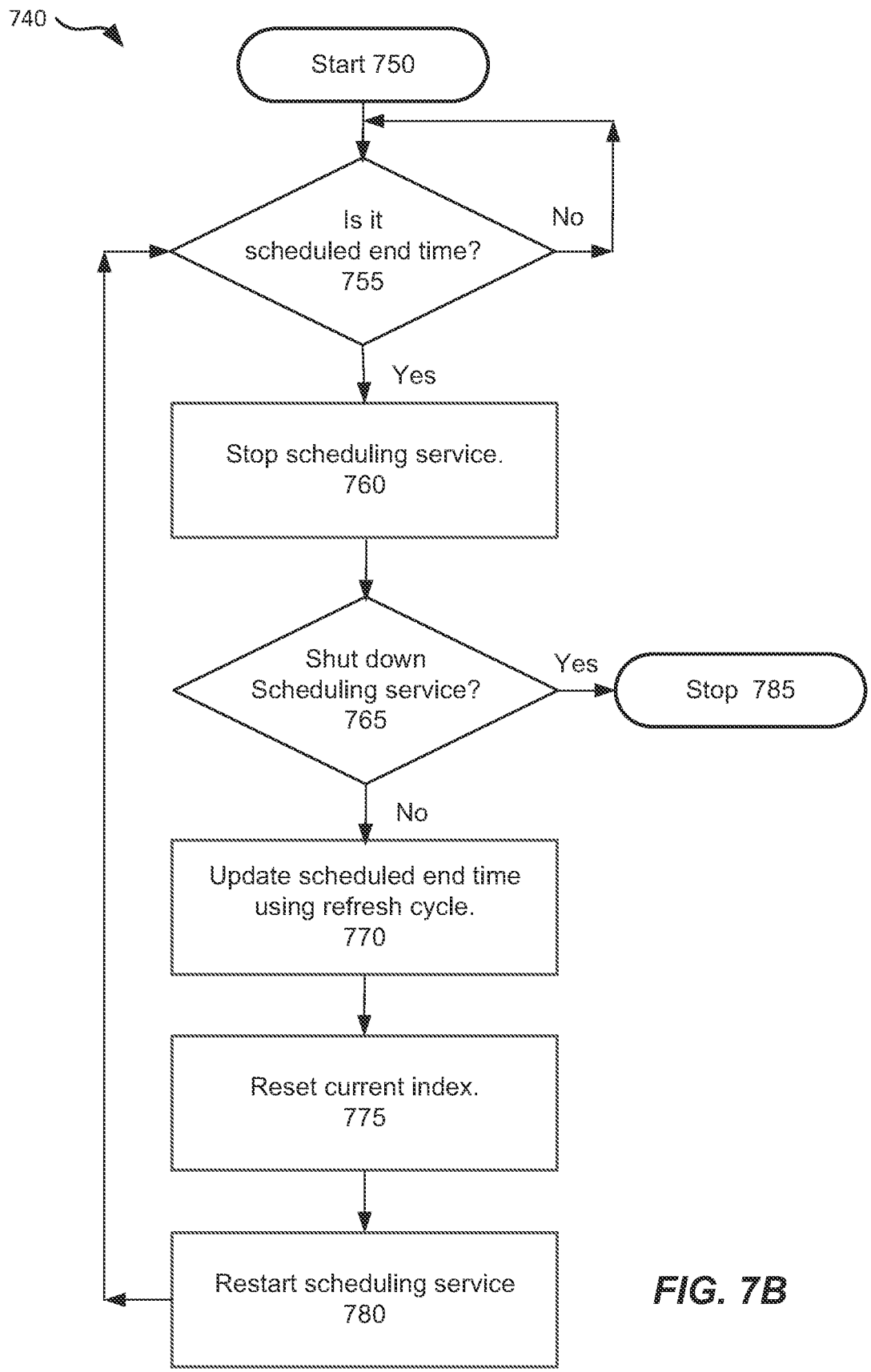
FIG. 7B shows a flow chart example of a process that may be performed based on a refresh cycle, in accordance with some embodiments.

FIG. 7B shows a flow chart example of a process that may be performed based on a refresh cycle, in accordance with some embodiments. The process 740 may start at block 750. At block 755, a test may be performed to determine if it is the scheduled end time. This may be determined based on a system clock of a machine and a value of the scheduled end time 370. If the system clock matches with the value of the scheduled end time, the scheduling service may be stopped. The schedulers in a cluster may be disposed. At block 765, a test may be performed to determine if the scheduled end time is related to a shutdown of the scheduling service. If it is, then the process may stop at block 785. From block 765, if it is not related to a shutdown, the process may flow to block 770 where a value of the scheduled end time 370 may be updated based on a refresh cycle to generate a value for a next scheduled end time. At block 775, the current index may be reset. For example, the current index may be reset to zero. At block 780, the scheduling service may be restarted. Restarting the scheduling service may include performing the operations described with FIG. 6 and FIG. 7A.

Figure 8A:
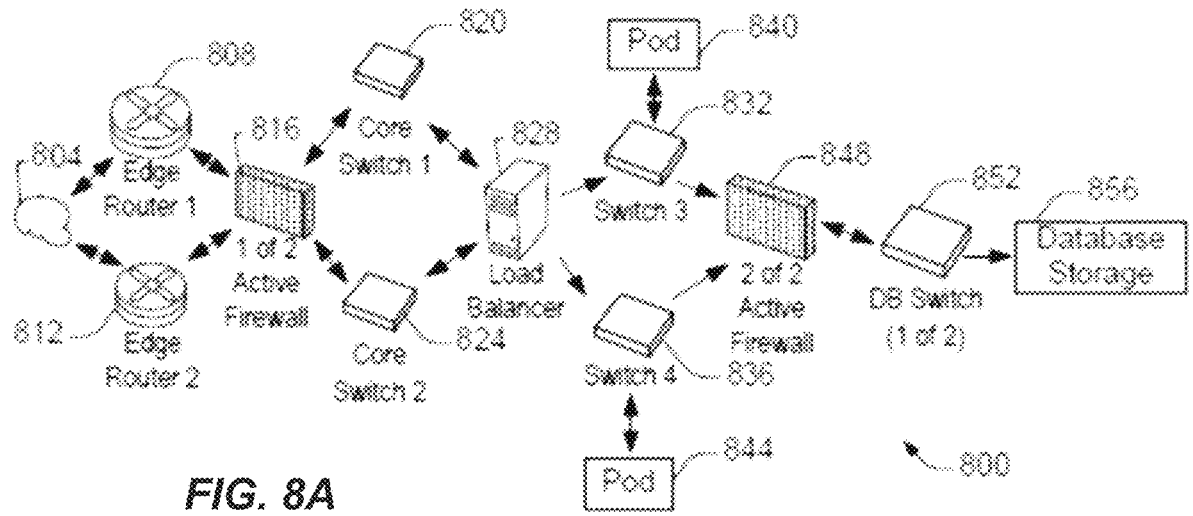
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
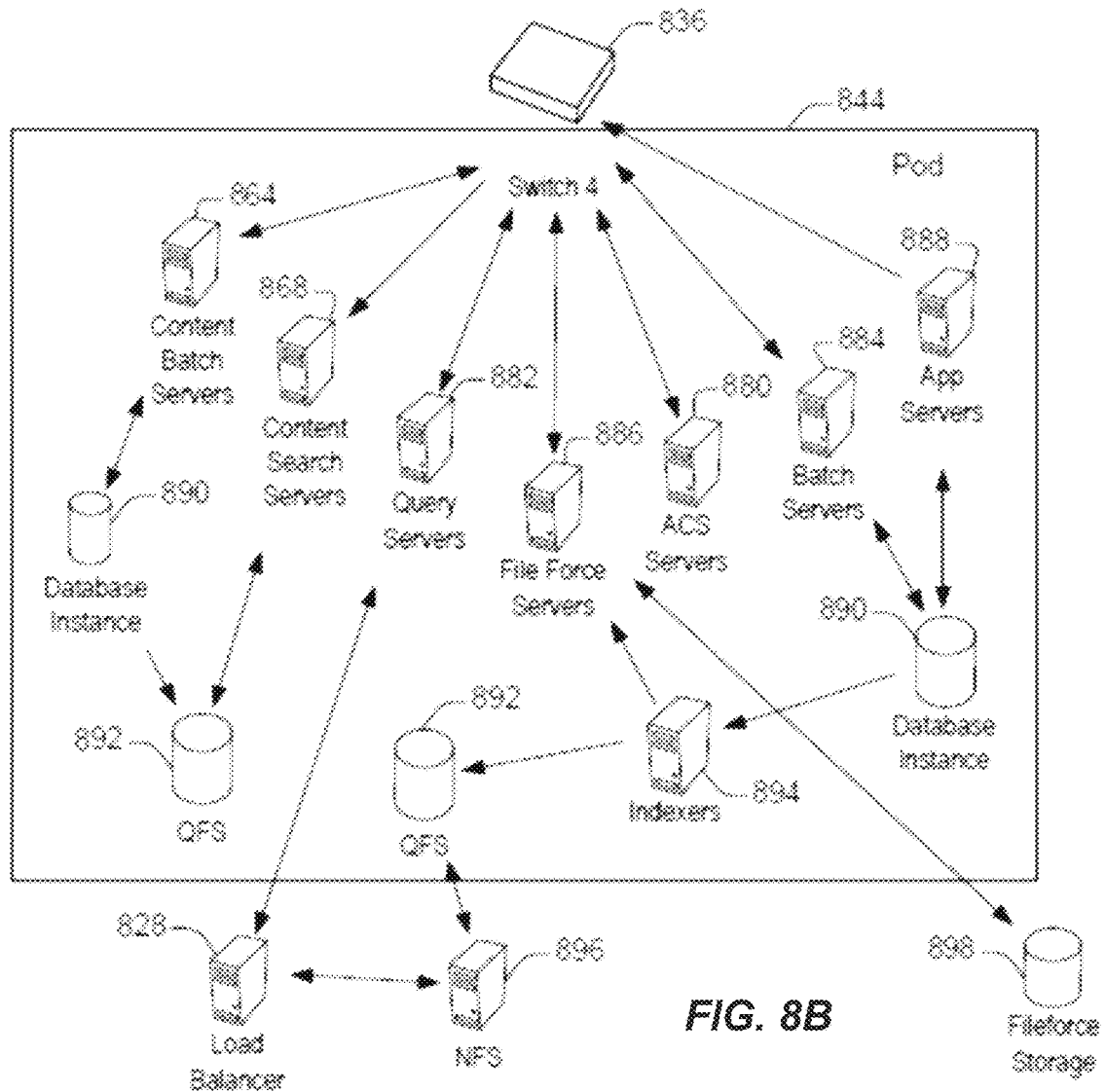
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times.

Thus, the batch servers 884 may transmit instructions to other servers, such as the app servers 888, to trigger the batch jobs. For some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
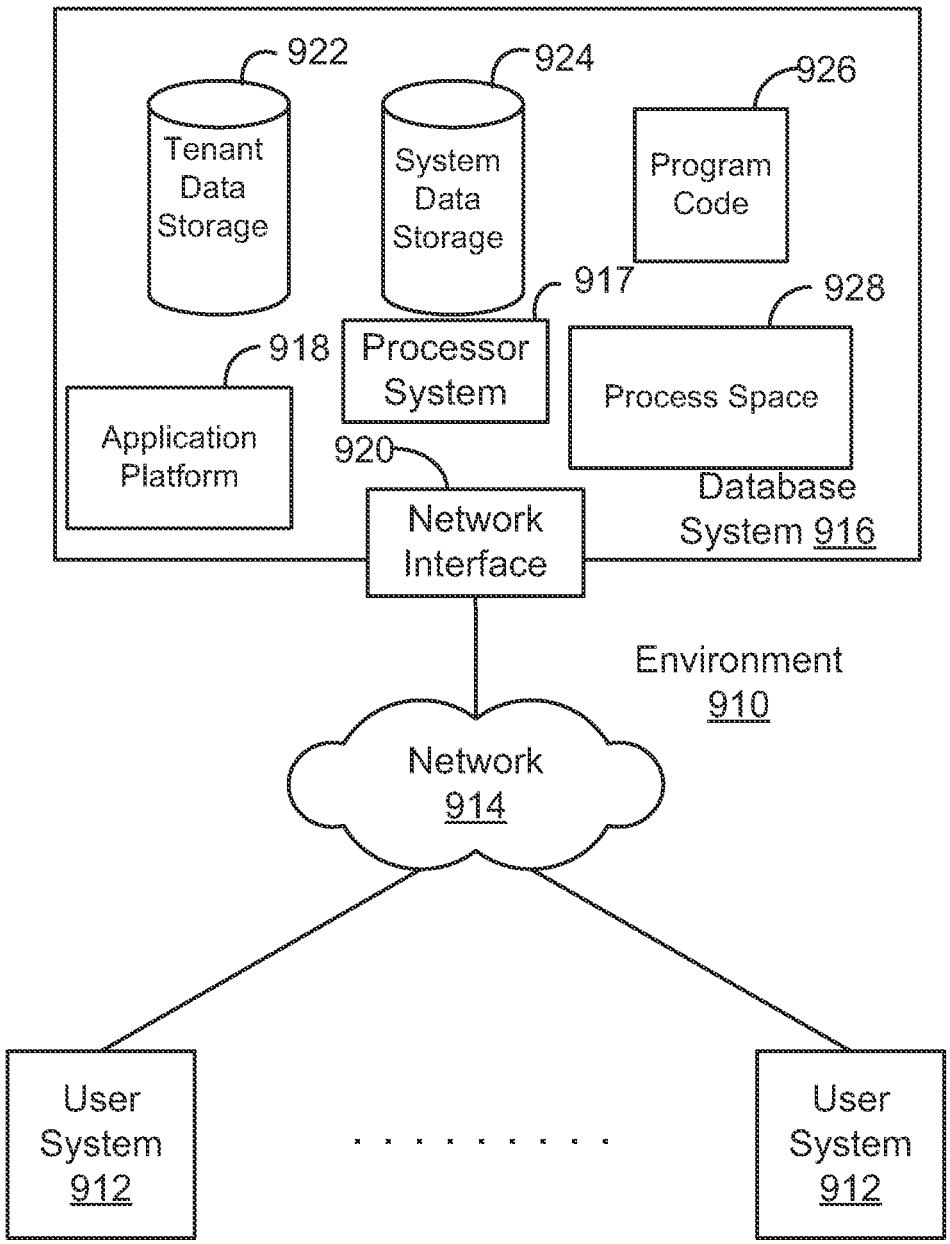
FIG. 9 shows a system diagram illustrating the architecture of a multi-tenant database environment, in accordance with some embodiments.
Figure 10:
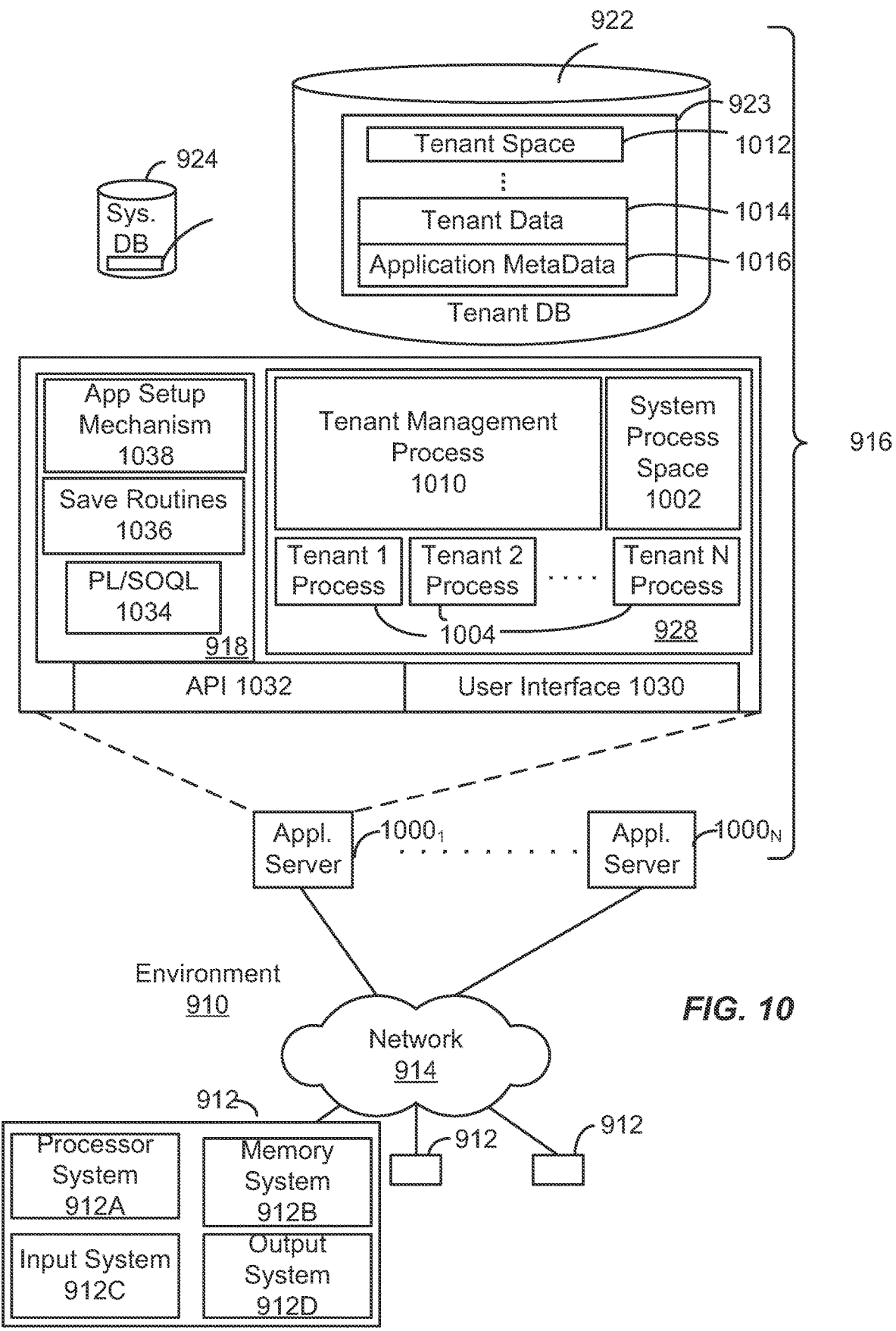
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method comprising:
    acquiring, using an active scheduling application, into a memory of a first instance of an asynchronous processing system running on a computer system framework, a first load of batch jobs to be executed by the first instance of an asynchronous processing system, the first load of batch jobs being included in a batch job table stored in a database and having a first load size, the database associated with the computer system framework;
    acquiring, using the active scheduling application, into a memory of a second instance of an asynchronous processing system running on the computer system framework, a second load of batch jobs to be executed by the second instance of an asynchronous processing system, the second load of batch jobs being included in the batch job table and having a second load size, the second load size being balanced with the first load size and including batch jobs that are not in included in the first load of batch jobs;
    scheduling, in the memory of the first instance of an asynchronous processing system, one or more batch jobs in the first load of batch jobs for execution by the first instance of an asynchronous processing system; and
    scheduling, in the memory of the second instance of an asynchronous processing system, one or more batch jobs in the second load of batch jobs for execution by the second instance of an asynchronous processing system, thereby optimizing scheduling functionality of the batch jobs in the batch job table.

2. The method of claim 1, wherein the first load of batch jobs is determined based on an index pointing to a batch job in the batch job table, and the first load size used to determine batch jobs to be included in the first load of batch jobs.

3. The method of claim 2, wherein the index points to a first batch job in the first load of batch jobs, and the index is updated to point to a first batch job in the second load of batch jobs after the acquiring of the first load of batch jobs into the memory of the first instance of an asynchronous processing system.

4. The method of claim 3, further comprising comparing the index to a total number of batch jobs in the batch job table to determine whether there are batch jobs remaining in the batch job table to enable the active scheduling application to be used to acquire a third load of batch jobs included in the batch job table into a memory of a third instance of an asynchronous processing system.

5. The method of claim 4, wherein there are no remaining batch jobs in the batch job table for the active scheduling application based on the index being equal to the total number of batch jobs in the batch job table.

6. The method of claim 5 wherein the acquiring of batch jobs using the active scheduling application is stopped based on an end of scheduling time being refreshed based on the end of scheduling time, the index is reset, and the end of scheduling time is updated to a next end of scheduling time based on a configurable refresh cycle.

7. The method of claim 6, wherein the active scheduling application is configured to acquire the batch jobs in the first load of batch jobs based on a failover of the first instance of an asynchronous processing system.

8. The method of claim 7, wherein the active scheduling application is configured to reduce contention to acquiring batch jobs stored in the batch job table.

9. The method of claim 8, wherein the first load of batch jobs comprises at least one batch job which comprises a plurality of batch tasks which are executed by the first instance of an asynchronous processing system.

10. An apparatus comprising:
one or more processors; and
a non-transitory computer readable medium storing a plurality of instructions, which when executed, cause the one or more processors to:
acquire, using an active scheduling application, into a memory of a first instance of an asynchronous processing system running on a computer system framework, a first load of batch jobs to be executed by the first instance of an asynchronous processing system, the first load of batch jobs being included in a batch job table stored in a database and having a first load size, the database associated with the computer system framework;
acquire, using the active scheduling application, into a memory of a second instance of an asynchronous processing system running on the computer system framework, a second load of batch jobs to be executed by the second instance of an asynchronous processing system, the second load of batch jobs being included in the batch job table and having a second load size, the second load size being balanced with the first load size and including batch jobs that are not in included in the first load of batch jobs;
schedule, in the memory of the first instance of an asynchronous processing system, one or more batch jobs in the first load of batch jobs for execution by the first instance of an asynchronous processing system; and
schedule, in the memory of the second instance of an asynchronous processing system, one or more batch jobs in the second load of batch jobs for execution by the second instance of an asynchronous processing system, thereby optimizing scheduling functionality of the batch jobs in the batch job table.

11. The apparatus of claim 10, wherein the first load of batch jobs is determined based on an index pointing to a batch job in the batch job table and the first load size used to determine batch jobs to be included in the first load of batch jobs.

12. The apparatus of claim 11, wherein the index points to a first batch job in the first load of batch jobs, and the index is updated to point to a first batch job in the second load of batch jobs after the storing of the first load of batch jobs into the memory of the first instance of an asynchronous processing system.

13. The apparatus of claim 12, further comprising instructions to compare the index to a total number of batch jobs in the batch job table to determine whether there are batch jobs remaining in the batch job table to enable the active scheduling application to be used to acquire a third load of batch jobs included in the batch job table into a memory of a third instance of an asynchronous processing system.

14. The apparatus of claim 13, wherein there are no remaining batch jobs in the batch job table for the active scheduling application based on the index being equal to the total number of batch jobs in the batch job table.

15. The apparatus of claim 14, wherein the instructions to acquire batch jobs using the active scheduling application and include instructions to stop scheduling based on an end of scheduling time being refreshed based on the end of scheduling time, reset the index, and update the end of scheduling time to a next end of scheduling time based on a configurable refresh cycle.

16. The apparatus of claim 15, wherein the active scheduling application is configured to acquire the batch jobs in the first load of batch jobs based on a failover of the first instance of an asynchronous processing system.

17. The apparatus of claim 16, wherein the active scheduling application is configured to reduce contention to acquiring batch jobs stored in the batch job table.

18. The apparatus of claim 17, wherein the first load of batch jobs comprises at least one batch job which comprises a plurality of batch tasks which are executed by the first instance of an asynchronous processing system.

19. A computer program product comprising computer-readable program code to be executed by one or more processors when retrieved from a non-transitory computer-readable medium, the program code including instructions to:
acquire, using an active scheduling application, into a memory of a first instance of an asynchronous processing system running on a computer system framework, a first load of batch jobs to be executed by the first instance of an asynchronous processing system, the first load of batch jobs being included in a batch job table stored in a database and having a first load size, the database associated with the computer system framework;
acquire, using the active scheduling application, into a memory of a second instance of an asynchronous processing system running on the computer system framework, a second load of batch jobs to be executed by the second instance of an asynchronous processing system, the second load of batch jobs being included in the batch job table and having a second load size, the second load size being balanced with the first load size and including batch jobs that are not in included in the first load of batch jobs;
schedule, in the memory of the first instance of an asynchronous processing system, one or more batch jobs in the first load of batch jobs for execution by the first instance of an asynchronous processing system; and schedule, in the memory of the second instance of an asynchronous processing system, one or more batch jobs in the second load of batch jobs for execution by the second instance of an asynchronous processing system, thereby optimizing scheduling functionality of the batch jobs in the batch job table.

20. The computer program product of claim 19, wherein the first load of batch jobs is determined based on an index pointing to a batch job in the batch job table, and the first load size used to determine batch jobs to be included in the first load of batch jobs.

21. The computer program product of claim 19, wherein the index points to a first batch job in the first load of batch jobs, and the index is updated to point to a first batch job in the second load of batch jobs after the storing of the first load of batch jobs into the memory of the first instance of an asynchronous processing system.

22. The computer program product of claim 19, further comprising instructions to compare the index to a total number of batch jobs in the batch job table to determine whether there are batch jobs remaining in the batch job table to enable the active scheduling application to be used to acquire a third load of batch jobs included in the batch job table into a memory of a third instance of an asynchronous processing system.

23. The computer program product of claim 22, wherein there are no remaining batch jobs in the batch job table for the active scheduling application based on the index being equal to the total number of batch jobs in the batch job table.

24. The computer program product of claim 23, wherein the instructions to acquire batch jobs using the active scheduling application include instructions to stop scheduling based on an end of scheduling time being refreshed based on the end of scheduling time, reset the index, and update the end of scheduling time to a next end of scheduling time based on a configurable refresh cycle.

25. The computer program product of claim 24, wherein the active scheduling application is configured to acquire the batch jobs in the first load of batch jobs based on a failover of the first instance of an asynchronous processing system.

26. The computer program product of claim 25, wherein the active scheduling application is configured to reduce contention to acquiring batch jobs stored in the batch job table.

27. The computer program product of claim 26, wherein the first load of batch jobs comprises at least one batch job which comprises a plurality of batch tasks which are executed by the first instance of an asynchronous processing system.

* * * * *